Feb. 17, 1970   H. ALLIGER   3,495,384
NOXIOUS RESIDUE ELIMINATOR FOR SMELTING PLANT
Filed June 24, 1968
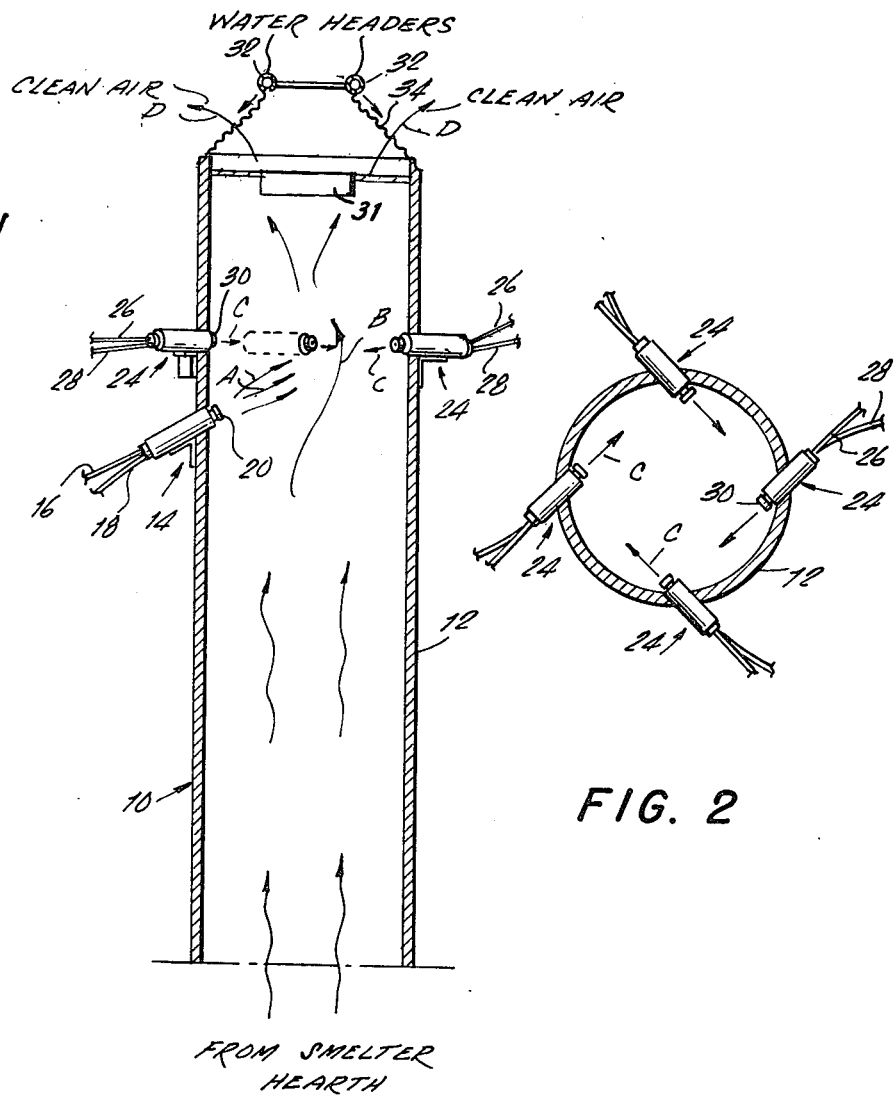
INVENTOR.
HOWARD ALLIGER
BY
Kenneth S. Goldfarb
ATTORNEY

United States Patent Office 3,495,384
Patented Feb. 17, 1970

3,495,384
NOXIOUS RESIDUE ELIMINATOR FOR
SMELTING PLANT
Howard Alliger, 10 Ponderosa Drive,
Melville, N.Y. 11746
Continuation-in-part of applications Ser. No. 594,844,
Nov. 16, 1966, and Ser. No. 645,948, June 14, 1967.
This application June 24, 1968, Ser. No. 739,499
Int. Cl. B01d 47/06
U.S. Cl. 55—233                    2 Claims

ABSTRACT OF THE DISCLOSURE

A noxious soot and gas eliminator for large smokestacks comprising spray nozzle means in a stack for delivering a finely divided mist and ultrasonic vibrations into the gases to be cleaned. The nozzles are annularly spaced so that the nozzles whirling provide a mist for the gases to be cleaned. Ultrasonic means are disposed above the soot and noxious material for imparting a furious turbulence to cause soot, gases and water to mix. Waterfall means are provided for demisting the gases, while allowing for the exhausting of clean gas and air.

---

This invention relates to a noxious soot and gas eliminator for large smokestacks and is a continuation in part of the applications of Howard Alliger, Ser. No. 594,844, filed Nov. 16, 1966, now U.S. Patent 3,390,869 for "Spray-Type Soot Eliminator," and of Ser. No. 645,948, filed June 14, 1967, now U.S. Patent 3,389,971, for "Spray-Type Soot Eliminator."

Various types of gas scrubber and anti-pollution devices have been devised for reducing air pollution arising from soot and noxious material being dispersed into the atmosphere through large smokestacks in which various fuels are burned and in such processes as smelting and the like. While these prior art devices were usually quite complicated and expensive and employed delicate moving parts, huge amounts of water, packing wheels, filters, louvers, cyclones and other elements which generally required frequent cleaning and maintenance, the present invention provides simple means for removing the soot and noxious material from such large smokestacks using a mist and ultrasonic vibrations to cause the soot, noxious material, gases and water to mix so that all of the soot and noxious material is screened from the atmosphere and the soot and noxious material is conveniently disposed of.

It is another object of the present invention to provide means for eliminating substantially all of the soot and noxious material, such as sulphur dioxide and the like, rising in large smokestacks while providing for the convenient exhausting of the cleaned air and gas into the atmosphere.

A further object of the invention is to provide a noxious soot and gas eliminator for large smokestacks which employs means for injecting fine mists and whirling the mists around the smokestacks together with ultrasonic means for not only increasing grain loading of the soot, but to make the soot sticky and grow in size.

The construction of this invention features the use of a plurality of annularly spaced nozzles which will cause the gases and mist to whirl and be more responsive to the ultrasonic vibrations so that the soot will become sticky and larger in size. Once this takes place, the soot and noxious matter can be easily removed while passing through a waterfall or the like. The increased size of the soot particles will reduce amounts of water used in removing the soot and like noxious material.

Still further objects and features of this invention reside in the provision of a noxious soot and gas eliminator for large smokestacks which is relatively easy and simple to install, inexpensive to construct and maintain, and which is substantially foolproof and is safe in operation.

These, together with the various ancillary objects and features of this invention, which will become apparent as the following description proceeds, are attained by this noxious soot and gas eliminator for large smokestacks, a preferred embodiment of which is illustrated in the accompanying drawing, by way of example, only, wherein:

FIG. 1 is a schematic vertical sectional view of a noxious soot and gas eliminator for large smokestacks constructed in accordance with the concept of the present invention; and FIG. 2 is a transverse sectional detail view through the stack schematically illustrating the arrangement of the nozzles.

With continuing reference to the accompanying drawing, as the following specification proceeds, reference numeral 10 generally designates a large smokestack having an outer cylindrical wall 12. Mounted on the wall 12 is a first spray nozzle 14 which extends upwardly at an acute angle to the horizontal and in operation water is fed through delivery conduits 16 at a rate of between .1 and 3.5 pounds per minute. Compressed gas, such as compressed air or steam, is fed through the conduit 18 at a pressure ranging from 50 to 100 pounds per square inch. The nozzle 14 is provided with an ultrasonic resonator or whistle 20 which provides for a minimum particle size and a fine mist spray. The particle size is in the order of 1 to 30 microns mean mass diameter, and is directed in the direction of arrows A across the stack 10 and partially in the direction of the upwardly rising gases resulting from smelting or like industrial operation.

Thereafter, the dirty gases mixed with the fine mist spray pass into an area in which a plurality of nozzles 24 are located. These nozzles are similar to the nozzle 14 and are fed with water through conduits 26 and air through conduits 28 and are provided with ultrasonic whistles 30.

As can be best seen in FIG. 2, the nozzles 24 are arranged at right angles with respect to each other and are annularly spaced about the cylindrical walls 12 so that the mist sprayed thereby in the direction of arrows C will cause a whirling of the gases to be cleaned.

A battery of ultrasonic whistles 31 similar to the whistle 20 are mounted above the nozzles 24 for imparting a furious turbulence to the already whirling gases to cause soot, noxious material, gases and water to mix.

At the top of the smokestack, water headers 32 will cascade water down along screens 34 so that the water along the screens will demist the rising gases and clean air will pass out through the screens in the direction of arrow D.

The ultrasonic whistles will cause the soot particles to grow in size and become sticky so that the waterfall may easily remove such noxious material as well as the mist in a convenient and efficacious manner.

I claim:
1. A noxious soot and gas eliminator for large smokestacks comprising a stack for receiving and conveying gases to be cleaned, spray nozzle means mounted in said stack for simultaneously delivering a gas and a liquid and including means imparting ultrasonic vibrations into said stack and across the path of said gases, said spray nozzle means including a plurality of nozzles mounted in the wall of said stack disposed in substantially the same horizontal plane and annularly spaced extending substantially tangentially to the wall of the stack and at an angle to each other so that the gases to be cleaned are whirled as they are conveyed upward of said stack, and waterfall means comprising a screen about the top of the stack and a water header delivering liquid on the screen and above said spray nozzle means for demisting said gases while allowing for exhausting clean gas and air.

2. A noxious soot and gas eliminator according to claim 1, including ultrasonic means disposed between said waterfall means and said spray nozzle means, including a battery of ultrasonic whistles arranged to direct vibrations downwardly of said stack, said waterfall means including screens above said ultrasonic means and at the top of said stack.

References Cited

UNITED STATES PATENTS

| | | | |
|---|---|---|---|
| 1,279,895 | 9/1918 | Minton | 261—17 |
| 2,215,484 | 9/1940 | St. Clair | 55—15 |
| 2,643,105 | 6/1953 | Lipowitz. | |
| 2,800,100 | 7/1957 | Boucher. | |
| 2,935,375 | 5/1960 | Boucher. | |
| 3,026,966 | 3/1962 | Asklof | 55—15 |
| 3,276,419 | 10/1966 | Rich. | |
| 3,389,971 | 6/1968 | Alliger | 55—263 |
| 3,390,869 | 7/1968 | Alliger | 55—263 |

FOREIGN PATENTS 179,626  12/1906  Germany.

FRANK W. LUTTER, Primary Examiner

BERNARD NOZICK, Assistant Examiner

U.S. Cl. X.R.

55—235, 240, 259, 277; 116—137; 239—4, 102; 261—17, 79, 106, 115